UNITED STATES PATENT OFFICE

CHARLES JOS. ULRICI, OF HAVANA, CUBA.

MEDICAL COMPOUND.

SPECIFICATION forming part of Letters Patent No. 333,361, dated December 29, 1885.

Application filed January 29, 1885. Serial No. 154,335. (No specimens.)

*To all whom it may concern:*

Be it known that I, CHARLES J. ULRICI, of Havana, Cuba, have invented a new and useful Medical Compound, which I denominate "Fluid Extract of Colloid Vegetable Pitch," of which the following is a full, clear, and exact description.

*First operation.*—First, take sixteen ounces, by weight, of Norwegian pitch and heat it in a water bath, by which heat the pitch is rendered fluid, it is then strained and afterward allowed to cool; second, take thirty-two ounces of cane-sugar in powder, mix it with forty-six ounces of bicarbonate of soda, in powder, and with the foregoing ingredients mix the mass of pitch and triturate the whole in a mortar for three hours; third, after said trituration is complete, take ten fluid pounds of distilled water and add it in portions to the above triturated mixture which is in the mortar, and continue the operation of trituration with the water until the whole has been mixed with the water, keeping up the operation of mixing and trituration for four hours; fourth, at the end of this time the mixture, which is in the mortar, of water, pitch, sugar, and bicarbonate of soda is to be placed in a suitable vessel and heated to the temperature yielded by a water bath and stirred with a glass rod for a period of five hours, after which the mixture is removed and allowed to stand for three days. It is then to be filtered. The mixture is now ready to be dialysed. The object of mixing the water, sugar, and bicarbonate of soda with the pitch is to facilitate the separation from the pitch by dialysis of the poisonous and injurious priciples or substances, while the useful principles or substances are retained.

*Second operation—Dialysis of the mixture.*—Take the solution of pitch and place it in an ordinary dialysing apparatus, which it is not necessary fully to describe, it being made with vegetable parchment in the usual manner. The dialyser is placed within a suitable vessel containing distilled water upon a level table, care being taken that the level of the exterior liquid is the same as the level of the liquid contained within the parchment or dialyser. The whole is allowed to stand three days, at the end of which time the exterior water is removed and a new quantity substituted. The first water is then tested with sulphuric acid, and note is taken whether there is any effervesence or discharge of carbonic acid. If there is, the dialysation is continued for three days more, when the exterior liquid is again tested in the same manner described. If there is no effervescence, then the operation of dialysation is complete, and the poisonous and injurious principles contained in the mixture will have been extracted therefrom and carried over to the exterior liquid, together with the sugar and the bicarbonate of soda, that which remains in the dialyser being a neutral solution of colloidal and chemical nature derived from the useful principles or components of the pitch, the poisonous or hurtful principles or components having been removed—that is to say, the pitch will be found to have lost by the dialysation not only all the poisonous and injurous principles, (which will be hereinafter described,) but also the sugar and bicarbonate of soda, that which remains in the dialyser being the useful principles of the pitch—the portion which I use.

*Third operation—Concentration of the dialysed liquid.*—This has for its object to concentrate the dialysed pitch. Take one-half of the solution of dialysed pitch and place it in a suitable vessel, to which apply a gentle heat and evaporate it slowly until it has been reduced to one pound. To this add four pounds of coarse sand, and then evaporate from this mixture, with gentle heat a portion of the water which the pound of pitch contained. The sand, after losing the water, will remain damp. Allow this to become cool, and then place it in a lixiviating apparatus.

*Fourth operation—Lixiviation of the dialysed and concentrated liquid.*—This operation has for its object to dissolve the concentrated and dialysed pitch that is imprisoned in the sand. This is accomplished by means of a suitable liquid vehicle, whereby the dialysed pitch will be liberated from the sand and taken up by the liquid vehicle, and in this manner is constituted the extract of dialysed or colloid pitch. The lixiviation is prepared with a liquid vehicle composed as follows: alcohol at 40°, one fluid pound; Price's glycerine, two fluid pounds. Take some of this liquid vehicle and add it, little by little, to the mixture of pitch and sand which is in the lixiviator. Leave this first part of the liquid vehicle in contact with the sand and pitch for four hours. At the end of this time throw away the first flow, and then collect the liquid which follows, which is the fluid extract of dialysed vegetable pitch, which constitutes my invention. Continue to add portions of the vehicle every hour until all the liquid vehicle has passed through the lixiviator, and then the operation is complete, and that which is obtained is my improved fluid extract of dialysed vegetable pitch.

Referring now to the first operation—namely, the filtration of the pitch—the object of the same is to separate from the pitch certain substances, which in its natural state are incorporated with it, such as vegetable remains, carbon-dust, bits of leaves, earthy matters, deposits of smoke, and other impurities. These substances are separated and removed by the filter, while the heat applied drives out a portion of the bad or poisonous principles, which become volatilized by the heat.

Vegetable pitch may be said to be composed of two parts, one portion consisting of combined dense empyreumatic resinous matters of dark color; and, second, another of liquid nature, which holds in solution the first part. The acrid and nauseous odor of the raw pitch is due to the poisonous or hurtful substances in what I have mentioned as the "second portion" of the pitch. Some of these poisonous or hurtful substances of the pitch are pyroligneous acid, formic acid, wood-spirit or methylic alcohol, aldehydes, acetones, methylic acetates, creosote, cyanides of ammonia, and benzines, and these substances, by means of the bicarbonate of soda, become capable of being removed by the operation of dialysis, as before described.

The useful or medicinal substances which remain in the pitch after the dialysation are chiefly the resinous bodies.

The operation of lixiviation makes a complete extract of the pitch which is imprisoned in the sand. Every portion of the liquid vehicle, when it comes in contact with the sand containing the pitch, becomes charged with a proportional quantity thereof, and each portion of the liquid vehicle takes up a portion of pitch until the whole has been completely dissolved and all the pitch contained in the sand joined to the water, alcohol, and glycerine, these three bodies being powerful and inoffensive solvents, and being the vehicle of which most fluid extracts are made.

This compound or fluid extract of dialysed pitch thus prepared is of great medicinal value, as the hurtful substances have been removed. It is used for various medical purposes, such as the treatment of bronchitis, of throat diseases, of ulcers of all kinds, genital diseases, syphilis, herpes, chronic rheumatism, scrofula, and sores of every nature. The ordinary dose is one table-spoonful of the compound in a cupful of sweetened water, administered internally, once in two to four hours, according to the nature of the disease.

The compound may also be applied externally for the cure of all kinds of sores and diseases of the skin.

Having thus described my invention, what I claim as new, and desire to secure by Letters Patent, is—

1. The combination, with colloid vegetable pitch, of glycerine and alcohol, substantially as herein set forth.

2. The herein-described composition, which consists of colloid pitch or pitch deprived of the lighter distillates—such as wood-spirit, the acetones, aldehydes, creosote, &c.—combined with glycerine and alcohol, in substantially the proportions herein stated.

CHARLES JOS. ULRICI.

Witnesses:
JAS. A. SPRINGER,
CHS. R. ULRICI.